United States Patent
Glassner

(10) Patent No.: US 8,393,247 B2
(45) Date of Patent: Mar. 12, 2013

(54) DUAL MASS FLYWHEEL

(75) Inventor: Rudolf Glassner, Kottes (AT)

(73) Assignee: Magna Powertrain AG & Co KG, Lannach (AT)

(*) Notice: Subject to any disclaimer, the term of this patent is extended or adjusted under 35 U.S.C. 154(b) by 0 days.

(21) Appl. No.: 13/147,048

(22) PCT Filed: Feb. 3, 2010

(86) PCT No.: PCT/EP2010/000632
§ 371 (c)(1),
(2), (4) Date: Jul. 29, 2011

(87) PCT Pub. No.: WO2010/089085
PCT Pub. Date: Aug. 12, 2010

(65) Prior Publication Data
US 2011/0283827 A1 Nov. 24, 2011

(30) Foreign Application Priority Data

Feb. 4, 2009 (DE) .......................... 10 2009 007 373

(51) Int. Cl.
*F16F 15/12* (2006.01)
(52) U.S. Cl. .................... 74/574.4; 74/572.2; 464/68.2
(58) Field of Classification Search ............... 74/572.1, 74/572.2, 574.2–574.4, 572.21; 192/30 V, 192/70.17, 207, 212, 205; 464/180, 68.2; 188/378–380; 123/192.1, 192.2
See application file for complete search history.

(56) References Cited

U.S. PATENT DOCUMENTS

| | | |
|---|---|---|
| 4,300,363 A | 11/1981 | Mathues |
| 4,467,905 A * | 8/1984 | Takeuchi ................. 192/214 |
| 2009/0272614 A1 | 11/2009 | Watarai |

FOREIGN PATENT DOCUMENTS

| | | |
|---|---|---|
| DE | 3213748 | 11/1982 |
| DE | 3139658 | 4/1983 |
| DE | 3447926 | 11/1985 |
| DE | 19729421 | 1/1998 |
| DE | 3448520 | 3/1999 |
| DE | 19808730 | 9/1999 |
| DE | 10297771 | 8/2005 |
| GB | 2231387 | 11/1990 |
| WO | 2004/016968 | 2/2004 |
| WO | 2008/010052 | 1/2008 |

OTHER PUBLICATIONS

Notification of Translation of the International Preliminary Report on Patentability, International Preliminary Report on Patentability and Written Opinion of the International Searching Authority for International Patent Application No. PCT/EP2010/000632, dated Aug. 22, 2011.

* cited by examiner

*Primary Examiner* — James Pilkington
*Assistant Examiner* — Richard Urbanski
(74) *Attorney, Agent, or Firm* — Dickenson Wright

(57) ABSTRACT

A dual mass flywheel for a drivetrain of a motor vehicle includes a primary flywheel mass, a secondary flywheel mass and a coupling device. The coupling device includes at least two pivot levers associated with the secondary flywheel mass that interact with a control profile formed on the primary flywheel mass. The pivot levers are pretensioned against the control profile in a radial direction by an elastic element. A control segment of the elastic element is disposed radially inside the control profile.

27 Claims, 2 Drawing Sheets

DUAL MASS FLYWHEEL

CROSS-REFERENCE TO RELATED APPLICATIONS

Figure 1:
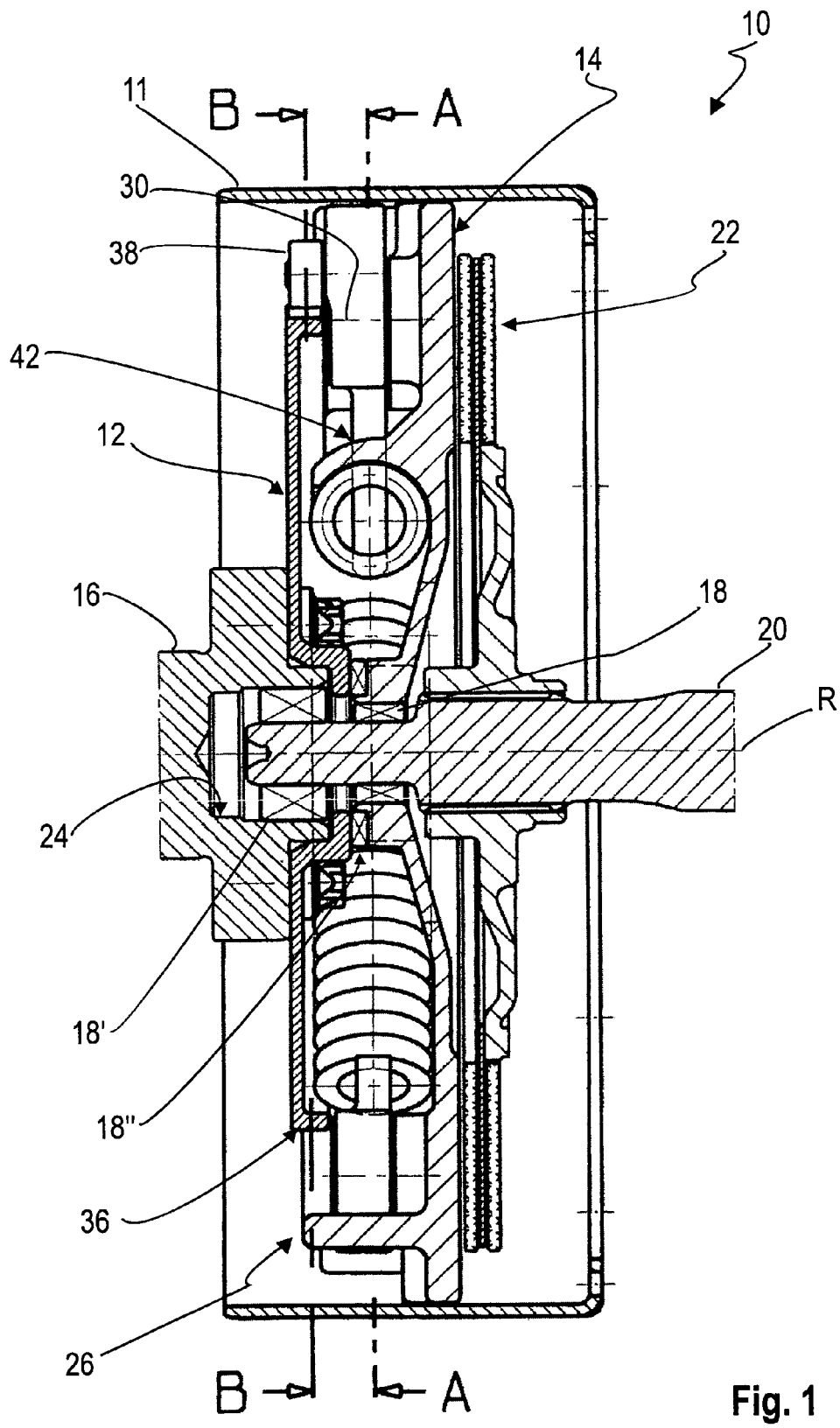

This application is a 371 U.S. National Stage of International Application No. PCT/EP2010/000632, filed Feb. 2, 2010, which claims priority to German Patent Application No. 10 2009 007 373.6, filed Feb. 4, 2009. The disclosures of the above applications are incorporated by reference herein.

FIELD

The present invention relates to a dual mass flywheel for a drive train of a motor vehicle.

BACKGROUND

Such a dual mass flywheel serves in a motor vehicle for the intermediate storage of kinetic energy during the idle strokes of the engine and for the taking up and damping of rotational vibrations between the engine and the drive train. For this purpose, the dual mass flywheel has a primary flywheel mass and a secondary flywheel mass which are rotatable with respect to an axis of rotation of the dual mass flywheel and which are rotationally elastically coupled to one another by a coupling device. The coupling device has at least two pivot levers which are associated with one of the two flywheel masses and which cooperate with a control section associated with the other flywheel mass. The pivot levers are in this respect biased from the outside to the inside toward the control section by elastic elements in a radial direction with respect to the axis of rotation.

A dual mass flywheel is, for example, known from WO 2004/016968 whose coupling device includes pivot levers which are pressed from the outside to the inside toward an inner cam by spring elements arranged in the radial direction.

DE 32 13 748 A1 describes a somewhat differently structured coupling device for a clutch disk. The spring elements provided for the biasing of the pivot levers toward an inner cam are here arranged tangentially to the axis of rotation about an inner cam.

It is disadvantageous with the known dual mass flywheels that on their operation an unwanted speed dependence of the coupling characteristics of the respective coupling device occurs due to the centrifugal forces acting on the individual components.

SUMMARY

An object of the present invention is to provide a dual mass flywheel having a coupling device which has fewer speed dependent coupling characteristics.

This object is satisfied by a dual mass flywheel having such a coupling device configured such that at least one respective middle section of the elastic elements is arranged within the control section in the radial direction with respect to the axis of rotation.

In the dual mass flywheel in accordance with the invention, the centrifugal forces acting on the elastic elements in operation are minimized in that the elastic elements are arranged more closely to the axis of rotation of the dual mass flywheel than previously usual. In the known designs, the minimal spacing of the elastic elements from the axis of rotation is limited by the embodiment of an inner cam cooperating with the pivot lever and having a specific control section. Provision is in contrast made in accordance with the invention to design the dual mass flywheel such that the elastic elements are arranged substantially further inwardly in the radial direction relative to the control section. This does not preclude that sections of the elastic elements project beyond the control section in the radial direction. It is only important that at least one respective center section or one center region of the elastic elements, i.e. for example, the center of gravity of the elastic elements, is arranged more closely to the axis of rotation of the dual mass flywheel than a surface of the control section cooperating with the pivot levers.

The elastic elements and/or the pivot levers cooperating with them can be made relatively short due to the inwardly disposed arrangement of the elastic elements. The reduction of the masses of the components used associated with this (compared with conventional concepts) additionally reduces the disturbing influence of the centrifugal forces acting on the individual components.

Since the elastic elements are particularly prone to centrifugal forces occurring during operation of the dual mass flywheel, this concept minimizes speed dependent effects in a particularly efficient manner. It is additionally simultaneously achieved that more construction space is available in the radial direction for the design of the control section. In other words, the design of the control section is only limited to a smaller degree by components disposed further outwardly. The dual mass flywheel in accordance with the invention can therefore also be given a more compact construction.

The control section is preferably formed at an inner cam.

In accordance with an embodiment, the elastic elements each extend substantially in a tangential direction, in particular with an—almost—complete compression of the elastic elements. "Substantially in a tangential direction" is to be understood such that even slight deviations from a tangential alignment are covered which, for example, occur on increasing extensions of the respective elastic elements.

The elastic elements can have a smaller spacing from the axis of rotation than the pivot axles of the pivot levers about which the pivot levers are pivotable. This means that not necessarily all sections of the pivot levers are always further away from the axis of rotation of the dual mass flywheel during operation than each section of the elastic elements. It is rather decisive in this embodiment that the pivot axles supporting the pivot levers are arranged radially further outwardly than the elastic elements. The elastic elements are in particular arranged within a circle in the radial direction which is arranged concentrically to the axis of rotation of the dual mass flywheel and whose radius is defined by the spacing of the pivot axles to the axis of rotation.

Provision can be made to associate a support means with each of the elastic elements, said support means being arranged at the flywheel mass with which the pivot levers are associated and being suitable for the support of the respective elastic element in a radial direction. The support means holds the elastic elements in its position intended for use during the operation of the dual mass flywheel and counters the occurring centrifugal forces. The support means is in particular molded directly at the corresponding flywheel mass. Since the support means and the elastic elements are associated with each flywheel mass, relative wear movements between these components are avoided. The support means can in particular be segments which—viewed from the axis of rotation—are slightly convexly curved to be able to accept a deformation of the elastic elements occurring in specific operating states in a radial direction in an improved manner.

It is furthermore possible that each of the elastic elements is in contact with a pair of pivot levers. Such a construction is simple to solve from a construction aspect and only requires a small number of components. The control section can be divided into a plurality of identical sections, with each pair of pivot levers being associated with one of the sections or cooperating with it.

The elastic elements are preferably springs, in particular helical springs.

An arrangement of the elastic elements radially within the control section can be implemented particularly advantageously when, in contrast to a conventional design, the elastic elements are arranged axially offset from the control section with respect to the axis of rotation of the dual mass flywheel, with this applying at least to the center plane of the elastic elements relative to the center plane of the control section.

At least one driver element (for example a roller device) can be associated with each pivot lever and is in contact with a control surface associated with the control section, with a first plane in which the driver element and the control surface are in contact being arranged axially offset with respect to the axis of rotation from a second plane in which the pivot levers are arranged. In other words, the elastic elements and the control section are arranged behind one another—optionally also partly overlapping in the axial direction—in the axial direction of the dual mass flywheel. Under certain circumstances, a space can be utilized in the radial direction within the control section for the arrangement of components of the coupling device, whereby the space requirements of the dual mass flywheel is reduced in the axial direction.

In accordance with an advantageous further development, a separate driver element is associated with each pivot lever. The elastic elements can furthermore be arranged in the second plane.

Provision can be made for the optimized transmission of the torque generated by the elastic elements and acting on the individual pivot levers onto the control section that the pivot levers each have two arms which include an angle which is smaller than 180°. This means that the two arms of the individual pivot levers are not arranged parallel to one another. The pivot axle of the pivot levers is in particular disposed between the end of the pivot lever which is acted on by the corresponding elastic element and the end which is in contact with the control section.

The pivot levers are in particular in contact with the control surface of the control section via a respective roller device. The pivot levers can be pivotally connected to the one of the two flywheel masses.

Further areas of applicability will become apparent from the description herein. The description and specific example in this summary are intended for purposes of illustration only and are not intended to limit the scope of the present invention.

DRAWINGS

Figure 2:
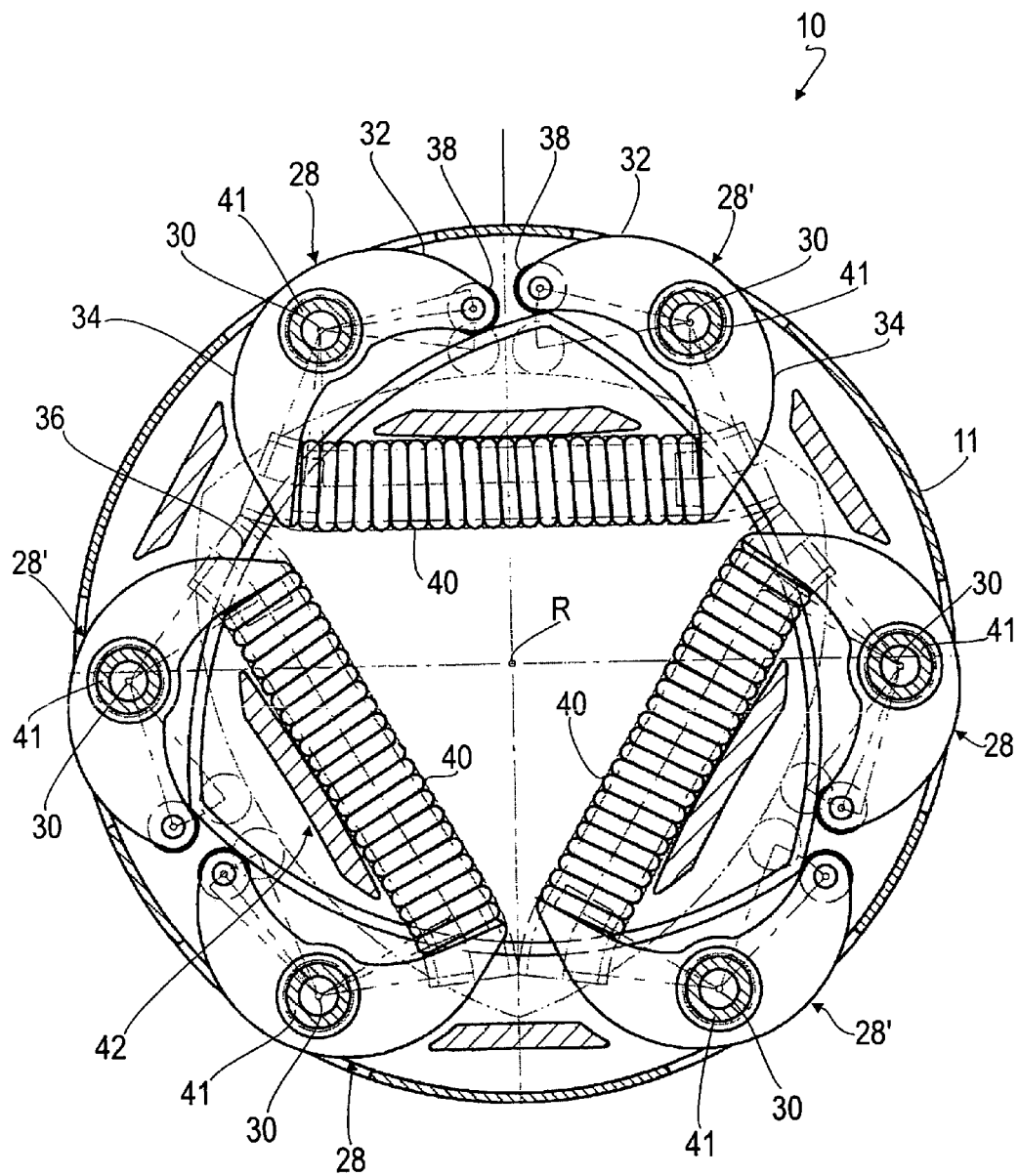

The drawings described herein are for illustrative purposes only of selected embodiments and not all possible embodiments such that the drawings are not intended to limit the scope of the present invention, wherein:

FIG. 1 shows a cross-section through a dual mass flywheel in accordance with the invention along the axis of rotation; and FIG. 2 shows a section through the dual mass flywheel in accordance with the invention of FIG. 1 perpendicular to the axis of rotation.

DETAILED DESCRIPTION

FIG. 1 shows a cross-section through a dual mass flywheel 10 along its axis of rotation R. The dual mass flywheel 10 has a housing 11, a primary flywheel mass 12 and a secondary flywheel mass 14. The primary flywheel mass 12 is rotationally fixedly connected to a crankshaft 16 of an engine, not shown, of a motor vehicle, whereas the secondary flywheel mass 14 is rotatably supported by a bearing 18 on a transmission input shaft 20 of a transmission, now shown, of the motor vehicle. The secondary flywheel mass 14 can selectively be connected in a drive effective manner to the transmission input shaft 20 by means of a clutch 22 which is only shown in part in FIG. 1. The transmission input shaft 20 is supported by a second bearing 18' in a recess 24 of the crankshaft 16. To take up axial forces acting on the secondary flywheel mass 14 which occur in specific operating states of the dual mass flywheel 10, a third bearing 18" is provided which is axially supported on the crankshaft 16 via a radially inwardly disposed section of the primary flywheel mass 12.

The flywheel masses 12, 14 are rotationally elastically coupled to one another by a coupling device 26.

FIG. 2 shows a section through the dual mass flywheel 10 perpendicular to the axis of rotation R along the line AA, with the representation of details of the support in the region about the transmission input shaft 20 having been omitted for reasons of clarity.

The individual components of the coupling device 26 can be seen from FIG. 2. They include a plurality of pivot levers 28 which are pivotably supported with respect to a respective pivot axle 30. Each of the pivot levers 28 has a driver arm 32 and a lever arm 34. The two arms 32, 34 include an angle which is smaller than 180° and larger than 90°. The geometry of the pivot levers 28 can, however, also have characteristics differing therefrom if other circumstances are present in the dual mass flywheel 10 due to the construction.

The respective driver arm 32 of the pivot levers 28 extends from the corresponding pivot axle 30 toward an end of the pivot lever 28 which is in contact via a driver roll 38 with a control surface on a control section 36 formed at the primary flywheel mass 12. The control section 36 is shown formed on an inner cam associated with the primary flywheel mass 12. The lever arm 34, in contrast, is in contact at its end remote from the pivot axle 30 with an end of an elastic element, shown herein as a helical spring 40. The other end of the respective spring 40 is in turn in contact with the lever arm 34 of an adjacent pivot lever 28'. The adjacent pivot lever 28' is substantially of the same function and construction as the pivot lever 28. It is, however, arranged with mirror symmetry—with respect to a plane of symmetry disposed between adjacent pivot axles 30. As such, the following description of the operation of pivot levers 28 is also applicable to the adjacent pivot lever 28'.

The active principle of the dual mass flywheel 10 can be explained in an illustrative manner with reference to FIG. 2. As already described above, the control section 36 is formed at the primary flywheel mass 12. The pivot levers 28 are, in contrast, pivotably supported at a respective hollow bolt 41 of the secondary flywheel mass 14 with respect to the pivot axles 30. To increase the stability, the pivot levers 28 can be engaged around in the manner of a cage and can hereby be supported at both sides (not shown).

It is stated in the following for the example of the pivot levers 28 upwardly disposed in FIG. 2 how a relative rotation of the two flywheel masses 12, 14 can result in different positions of the pivot levers 28. A first state is shown in which the driver rolls 38 of the pivot levers 28 are arranged at a maximum distance from the axis of rotation R due to the embodiment of the control section 36. The spring 40 is maximally compressed in this state. On a change of the relative position of the two flywheel masses 12, 14 with respect to one another—for example on a rotation of the primary flywheel mass 12 clockwise relative to the secondary flywheel mass 14—the driver rolls 38 run through a central region of the control surface on the control section 36 associated with them. A position of the primary flywheel mass 12 relative to the secondary flywheel mass 14 is shown by dashed lines in FIG. 2 and defines a second state in which the driver rolls 38 approach closest to the axis of rotation R. The spring 40 is minimally compressed in this second state as is likewise indicated by dashed lines. The spring 40 also deforms slightly on the extension due to the pivoting of the pivot levers 28 and presses snugly at a support segment 42 which holds the spring 40 in its radial position against the centrifugal forces acting thereon. To take up the curvature of the spring 40 ideally on its extension, the support segment 42 is slightly convexly curved viewed from the axis of rotation.

When the primary flywheel mass 12 rotates further clockwise relative to the secondary flywheel mass 14, the driver rolls 38 are pressed outwardly again by the control surface of the control section 36, whereby a compression of the spring 40 takes place via the pivot levers 28 which generates a force acting against the relative rotation of the flywheel masses 12, 14.

In other words, a respective spring 40 and a segment of the control section 36 are associated with each pair of pivot levers 28 and 28', whereby a threefold symmetry of the coupling device 236 results with respect to the axis of rotation R. More or fewer pivot lever pairs can generally also be provided. It is also possible not to provide any pivot lever pairs, but rather to support one end of the springs 40 at the secondary flywheel mass 14.

FIG. 2 illustrates the advantage which results due to the arrangement of the springs 40 substantially radially within the control section 36. Due to the arrangement of the springs 40 more closely to the axis of rotation R, the centrifugal forces acting on them are minimized. In addition, construction space is saved in the radial direction or the control section 36 can extend further outwardly in the radial direction than with conventional dual mass flywheels. A greater freedom of design is hereby present with respect to the pitches of the control section 36. In addition, the arms 32, 34 of the pivot levers 28 and the springs 40 can be made relatively short, which likewise has a positive effect on a reduction of the changes of the coupling characteristics depending on the centrifugal force.

Again with reference to FIG. 1, it will be described in the following how the construction space disposed within the control section 36 is used for the arrangement of the springs 40. To design the construction of the pivot levers 28 in as simple a manner as possible and to avoid a mutual blocking of the pivot levers 28 and of the control section 36, these components are arranged offset in the axial direction. The pivot levers 28 and the springs 40 are substantially disposed in a plane which corresponds to the section plane AA. A plane BB which extends centrally through the control surface of the control section 36 extending perpendicular thereto is disposed in the direction toward the crankshaft 16 offset parallel thereto. The section plane BB also extends substantially centrally through the driver rolls 38. In other words, the driver roller 38 does not lie in the plane which is spanned by the arms 32, 34 of the pivot levers 28 (plane AA). The driver rollers 38 are rather supported laterally at the pivot levers 28.

The arrangement of individual components of the coupling device 26 offset in the axial direction of the dual mass flywheel 10 only results in a slightly larger extent of the dual mass flywheel 10 in the axial direction since the control section 26 and the driver rolls 38 in contact therewith only have a small axial extent. The parallel offset resulting therefrom between the pivot levers 28 and the springs 40, on the one hand, and the control section 26 and the driver rolls 38, on the other hand, is therefore only small, whereas the construction space saving in the radial direction is significant. As shown, a compact dual mass flywheel 10 is thus provided which is additionally less influenced by centrifugal forces occurring in operation.

REFERENCE NUMERAL LIST 10 dual mass flywheel
11 housing
12 primary flywheel mass
14 secondary flywheel mass
16 crankshaft
18, 18', 18" bearings
20 transmission input shaft
22 clutch
24 recess
26 coupling device
28 pivot lever
30 pivot axle
32 driver arm
34 lever arm
36 control section
38 driver roll
40 spring
41 bolt
42 support segment
R axis of rotation
AA section plane
BB driver roller/control section plane

The invention claimed is:

1. A dual mass flywheel for a drive train of a motor vehicle, comprising a primary flywheel mass and a secondary flywheel mass which are rotatable with respect to an axis of rotation (R) of the dual mass flywheel and which are rotationally elastically coupled to one another by a coupling device, wherein the coupling device has at least two pivot levers which are associated with the secondary flywheel mass and which cooperate with a control section associated with the primary flywheel mass, wherein the pivot levers are biased by elastic elements from the outside to the inside toward the control section with respect to the axis of rotation (R) in a radial direction, wherein at least one respective middle section of the elastic elements is arranged within the control section in the radial direction with respect to the axis of rotation (R), and wherein the elastic elements have a smaller spacing from the axis of rotation (R) than the pivot axles of the pivot levers about which the pivot levers are pivotable.

2. The dual mass flywheel in accordance with claim 1, wherein the control section is formed at a cam of the primary flywheel mass.

3. The dual mass flywheel in accordance with claim 1, wherein the elastic elements each extend substantially in a tangential direction to a circle centered on the axis of rotation (R).

4. The dual mass flywheel in accordance with claim 1, wherein a support means is associated with each elastic element and is arranged at the one of the two flywheel masses with which the pivot levers are associated and which is suitable for supporting the respective elastic element in a radial direction.

5. The dual mass flywheel in accordance with claim 1, wherein each of the elastic elements is in contact with a pair of pivot levers.

6. The dual mass flywheel in accordance with claim 1, wherein the elastic elements are springs.

7. The dual mass flywheel in accordance with claim 1, wherein the elastic elements are helical springs.

8. The dual mass flywheel in accordance with claim 1, wherein the elastic elements are arranged axially offset from the control section with respect to the axis of rotation (R).

9. The dual mass flywheel in accordance with claim 1, wherein at least one driver element is associated with each pivot lever and is in contact with the control section, and wherein a first plane (BB), in which the driver element and the control section are in contact, is arranged axially offset with respect to the axis of rotation (R) from a second plane (AA) in which the pivot levers are arranged.

10. The dual mass flywheel in accordance with claim 9, wherein a separate driver element is associated with each pivot lever.

11. The dual mass flywheel in accordance with claim 9, wherein the elastic elements are arranged in the second plane (AA).

12. The dual mass flywheel in accordance with claim 1, wherein the pivot levers each have two arms.

13. The dual mass flywheel in accordance with claim 1, wherein the pivot levers are pivotally connected to the secondary flywheel mass.

14. The dual mass flywheel in accordance with claim 1, wherein the pivot levers are in contact with the control section via a respective roller device.

15. A dual mass flywheel for a drivetrain of a motor vehicle, comprising:
a primary flywheel mass rotatable about an axis of rotation and defining a control section having a control surface;
a secondary flywheel mass rotatable about the axis of rotation and defining a support segment located radially inwardly of the control section; and
a coupling device for rotationally elastically coupling the primary flywheel mass and the secondary flywheel mass, the coupling device includes a pivot lever mounted to the secondary flywheel mass for pivotal movement about a pivot axle located radially outwardly of the support segment and having a first arm and a second arm, an elastic element retained against the support segment and engaging the first arm of the pivot lever, and a driver member mounted to the second arm of the pivot lever and engaging the control surface of the control section, wherein a portion of the elastic element engaging the support segment is located radially inwardly of the control section with respect to the axis of rotation.

16. The dual mass flywheel of claim 15 wherein the coupling device includes a second pivot lever mounted to the secondary flywheel mass for pivotal movement about a second pivot axle that is circumferentially aligned with the first pivot axle, and wherein the second pivot lever has a first arm engaging the elastic element and a second arm to which a second driver member is mounted which engages the control surface of the control section.

17. The dual mass flywheel of claim 16 wherein the first pivot lever and the second pivot lever define a first pair of pivot levers associated with the elastic element, wherein the coupling device further includes a second pair of pivot levers that are pivotally supported from the secondary flywheel mass, and a second elastic element retained against the support segment and engaging respective first arms of the second pair of pivot levers, and wherein the control section includes a second control surface engaged by driver members associated with respective second arms of the second pair of pivot levers.

18. The dual mass flywheel of claim 15 wherein a first plane passing centrally through the control section and the driver member is axially offset relative to a second plane passing centrally through the pivot lever and the elastic member.

19. The dual mass flywheel of claim 15 wherein the elastic element is a helical spring extending substantially in a tangential direction.

20. The dual mass flywheel of claim 19 wherein a first end of the helical spring engages the first arm of the pivot lever and a second end engages the secondary flywheel mass.

21. The dual mass flywheel of claim 15 wherein the control surface of the control section is configured to define a first segment located a first radial distance from the axis of rotation and a second segment located a second radial distance from the axis of rotation and which is less than the first radial distance, wherein the engagement of the driver member with the first segment causes the pivot lever to maximally compress the elastic element, and wherein the engagement of the driver member with the second segment causes the pivot lever to minimally compress the elastic element.

22. A dual mass flywheel for a drivetrain of a motor vehicle, comprising:
a primary flywheel mass and a secondary flywheel mass rotatable about an axis of rotation; and
a coupling device for rotationally elastically coupling the primary flywheel mass and the secondary flywheel mass, the coupling device includes a first pivot lever mounted to the secondary flywheel mass for pivotal movement about a first pivot axle and having a first arm and a second arm, a control section associated with the primary flywheel mass that is located radially inwardly relative to the first pivot axle, an elastic element engaging the first arm of the first pivot lever, and a driver member mounted to the second arm of the first pivot lever and engaging a control surface on the control section, wherein a portion of the elastic element is located radially inwardly of the control section with respect to the axis of rotation, and wherein a first plane passing centrally through the control section and the driver member is axially offset relative to a second plane passing centrally through the first pivot lever and the elastic member.

23. The dual mass flywheel of claim 22 wherein the coupling device includes a second pivot lever mounted to the secondary flywheel mass for pivotal movement about a second pivot axle that is circumferentially aligned with the first pivot axle, and wherein the second pivot lever has a first arm engaging the elastic element and a second arm to which a second driver member is mounted which engages the control surface of the control section.

24. The dual mass flywheel of claim 23 wherein the first pivot lever and the second pivot lever define a first pair of pivot levers that are associated with the elastic element, wherein the coupling device further includes a second pair of pivot levers and a second elastic element engaging respective first arms of the second pair of pivot levers, and wherein the control section includes a second control surface engaged by driver members associated with respective second arms of the second pair of pivot levers.

25. The dual mass flywheel of claim 22 wherein the control surface is configured to define a first segment located a first radial distance from the axis of rotation and a second segment located a second radial distance from the axis of rotation and which is less than the first radial distance, wherein engagement of the drive member with the first segment causes the first pivot lever to maximally compress the elastic element, and wherein engagement of the drive member with the second segment causes the first pivot lever to minimally compress the elastic element.

26. The dual mass flywheel of claim 22 wherein the elastic element is a helical spring extending substantially in a tangential direction, and wherein the first arm of the first pivot lever engages a first end of the helical spring.

27. The dual mass flywheel of claim 26 wherein the coupling device further includes a support segment in contact with an intermediate portion of the helical spring, and wherein the support segment is located radially inwardly of the control section.

* * * * *